G. DEYCKE.
PREPARATION OF A FAT LIKE SUBSTANCE FROM THE BODIES OF BACTERIA.
APPLICATION FILED OCT. 3, 1906.

972,345.

SPECIMENS.

Patented Oct. 11, 1910.

UNITED STATES PATENT OFFICE.

GEORG DEYCKE, OF CONSTANTINOPLE, TURKEY, ASSIGNOR TO THE FIRM OF KALLE AND COMPANY AKTIENGESELLSCHAFT, OF BIEBRICH, GERMANY.

PREPARATION OF A FAT-LIKE SUBSTANCE FROM THE BODIES OF BACTERIA.

972,345.      Specification of Letters Patent.      Patented Oct. 11, 1910.

Application filed October 3, 1906. Serial No. 337,255. (Specimen.)

*To all whom it may concern:*

Be it known that I, GEORG DEYCKE, subject of the Emperor of Germany, and residing at Constantinople, Turkey, have invented certain new and useful Improvements in the Preparation of a Fat-Like Substance from the Bodies of Bacteria, of which the following is a specification.

My invention relates to the preparation of a fat-like substance from the microbes bearing the scientific name *Streptothrix leproides* (*Deutsch medicinische Wochenschrift* 1905, page 489), which substance may be employed in the therapeutic treatment, and in the prophylaxis, of lepra and tuberculosis.

In the following I give an example of the methods, by which my invention may be carried into effect.

Figure 1:
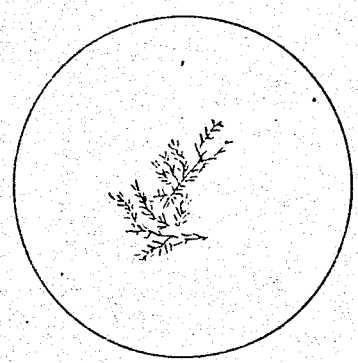
Figure 2:
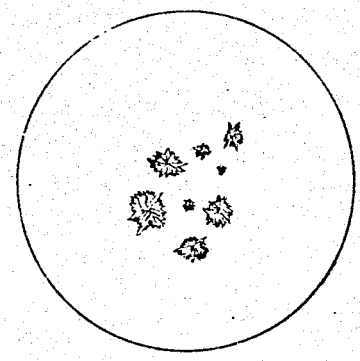

Homogeneous cultures of *Streptothrix leproides* are washed with water, ground up with ammonia liquor, treated with Adams solution (a mixture consisting of 110 parts by volume of ether, and 100 parts by volume of a mixture composed of 30 grams of ammoniac water specific gravity 0.92—834 grams of 90 per cent. alcohol,—and 136 grams of water,) washed again and dried in a vacuum. The dry bacilli are very thoroughly extracted by means of ether or other liquid applicable for the extraction of fats (chloroform, ligroin, benzene, carbondisulfid) the solid residue being repeatedly ground to obtain a complete disintegration of the bacillic mass. The extract in solution being filtered off is then freed from ether by distillation. The residue of the distillation is dissolved in hot alcohol. The hot alcoholic solution is filtered. On cooling a whitish substance separates from the liquid. It is filtered off and washed with cold alcohol and may be further purified, if necessary, by redissolving it in hot alcohol, separating it again by cooling, filtering and washing. In this manner I obtain a white solid substance, which on saponification proves to be a glycerin ester of a fatty acid. The new substance is very easily soluble in ether and chloroform, difficultly soluble in cold alcohol or wood spirits. It liquefies on heating. The melting point of this substance is between 48° and 52° C. and it is not easily affected by exposure to atmospheric air, a relatively long exposure being required to decompose it. In this particular it is clearly distinguishable from other fats which on exposure to air quickly decompose and become rancid. Another distinguishing characteristic of the substance is the form in which it crystallizes out of olive oil, the crystals being white and like flat needles in form, as shown in Figure 1 of the accompanying drawing. Fig. 2 of the drawing illustrates the form in which the substance crystallizes out of alcohol.

In the drawing the crystals are shown as magnified about 25 times their natural size which is about ¼ millimeter.

The substance obtained as herein before described further possesses the following characteristics. It contains about 92% of fatty acids insoluble in water (Hehner's figure), its saponification numeral lies at 210 (1 mgr. KOH per 1 g. fat), takes up 14—20 g. iodin per 100 g. fat, contains no volatile fatty acids and requires from zero to a maximum of 1.7 mgr. per 1 g. KOH for each grain of fat to absorb the free fatty acids.

If the new substance is introduced into the system of patients suffering of lepra or tuberculosis by subcutaneous injection, it shows a therapeutic effect on these diseases. It also produces immunity against virulent tubercle-bacilli. The application of the new substance may be effected as follows: The substance is dissolved in olive oil (0.2 g. to 2.0 g. in 1000 ccm. of olive oil). Other suitable medicaments for example bencylchlorid, may be added to this solution which is injected into the diseased organism, the amount depending of course on the state of the disease or the extent to which it is developed. The effect of the substance employed in the manner described, may be referred to as acting to "dissolve," in a bacteriological sense, the bodies of acid-proof bacteria. The danger for an organism infected by acid-proof bacilli, consists in the fact that neither the natural protective powers of the organism nor the antitoxical bodies (bacteriolysins) formed in the organism by reason of the infection, are able to attack the bacteria themselves and destroy them, because the bacilli are protected against such attacks by their coating composed partially of fat and wax-like substances. If, however, the substance herein described has been introduced into the organism, such coating of the bacilli is loosened or destroyed to such an extent that a complete bacteriolysis of the bacteria may take place. In this sense the substance is said to cause a dissolving of the bacteria.

In the example given above, other microbes for instance tubercle-bacilli or other bacteria yielding acid proof colorations with coal tar colors may be employed instead of *Streptothrix leproides*.

Now what I claim is:—

1. The herein described process of producing from acid resisting bacteria a fat-like substance having the properties described, consisting in washing the bacteria with water, grinding them in ammonia liquor, treating with Adams solution, again washing the solids, drying them in vacuum, subjecting the dried bacilli to the action of a fat solvent, filtering the extract, distilling the extracting medium, and crystallizing the residue from alcohol.

2. The herein described process of producing from *Streptothrix leproides* a fat-like substance having the properties described, consisting in washing the bacteria with water, grinding them in ammonia liquor, treating with Adams solution, again washing the solids, drying them in vacuum, subjecting the dried bacilli to the action of a fat solvent, filtering the extract, distilling the extracting medium, and crystallizing the residue from alcohol.

3. The herein described fat-like substance obtained as described and being a solvent for virulent lepra and tuberculosis bacteria, said substance crystallizing out of olive oil in the form of white flat needles, having its melting point at 48° to 52° C., being easily soluble in ether and chloroform, almost insoluble in cold alcohol, soluble to a high degree in boiling alcohol, contains about 92% of fatty acids insoluble in water, the saponification numeral of which lies at 210, takes up 14–20 g. iodin per 100 g. fat, contains no volatile fatty acids and requires, to absorb the free fatty acids, from zero to a maximum of 1.7 mgr. per 1 g. KOH for each gram of fat, and not easily affected by exposure to atmospheric air.

GEORG DEYCKE.

Witnesses:
 IGNAT ROSENBERG,
 GOTTHOLD FISCHER.